(No Model.) 6 Sheets—Sheet 1.
E. HORTON.
AUTOMATIC MILLING MACHINE.
No. 316,786. Patented Apr. 28, 1885.
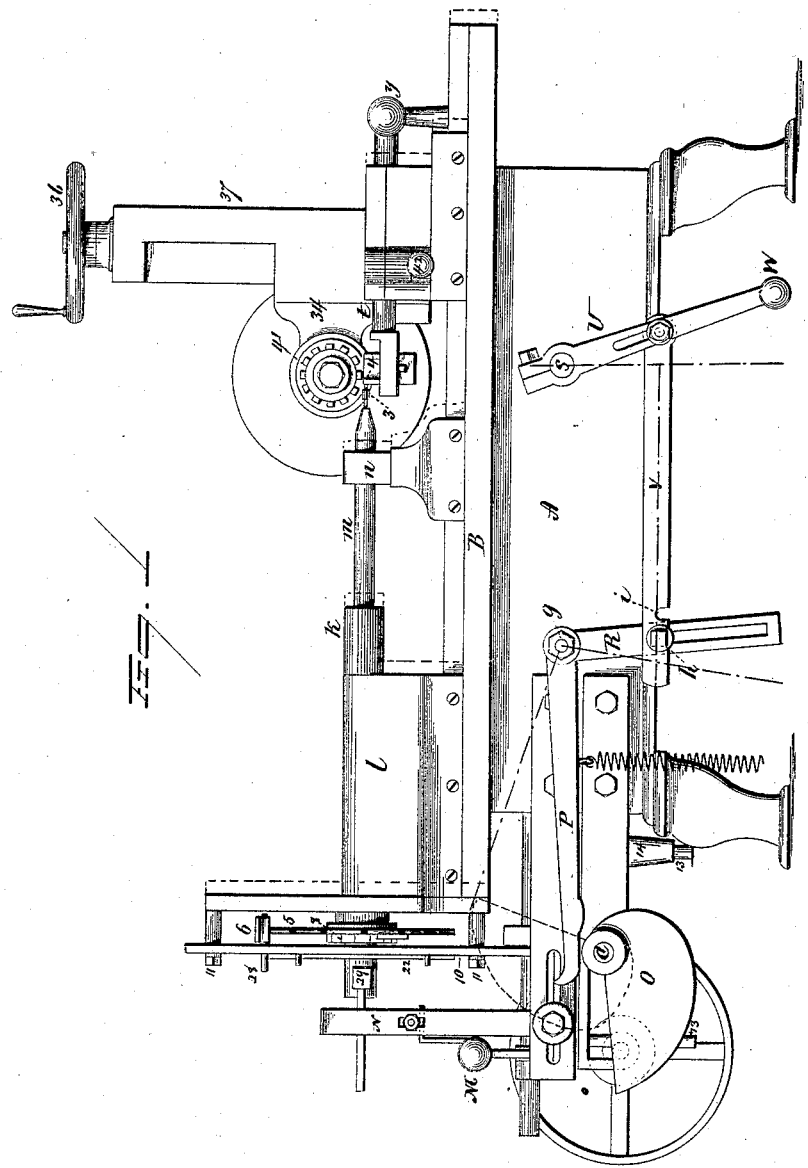
Witnesses
J. N. Shumway.
Jos. L. Earle.
Everett Horton
Inventor
By Atty Wm L. Earle.

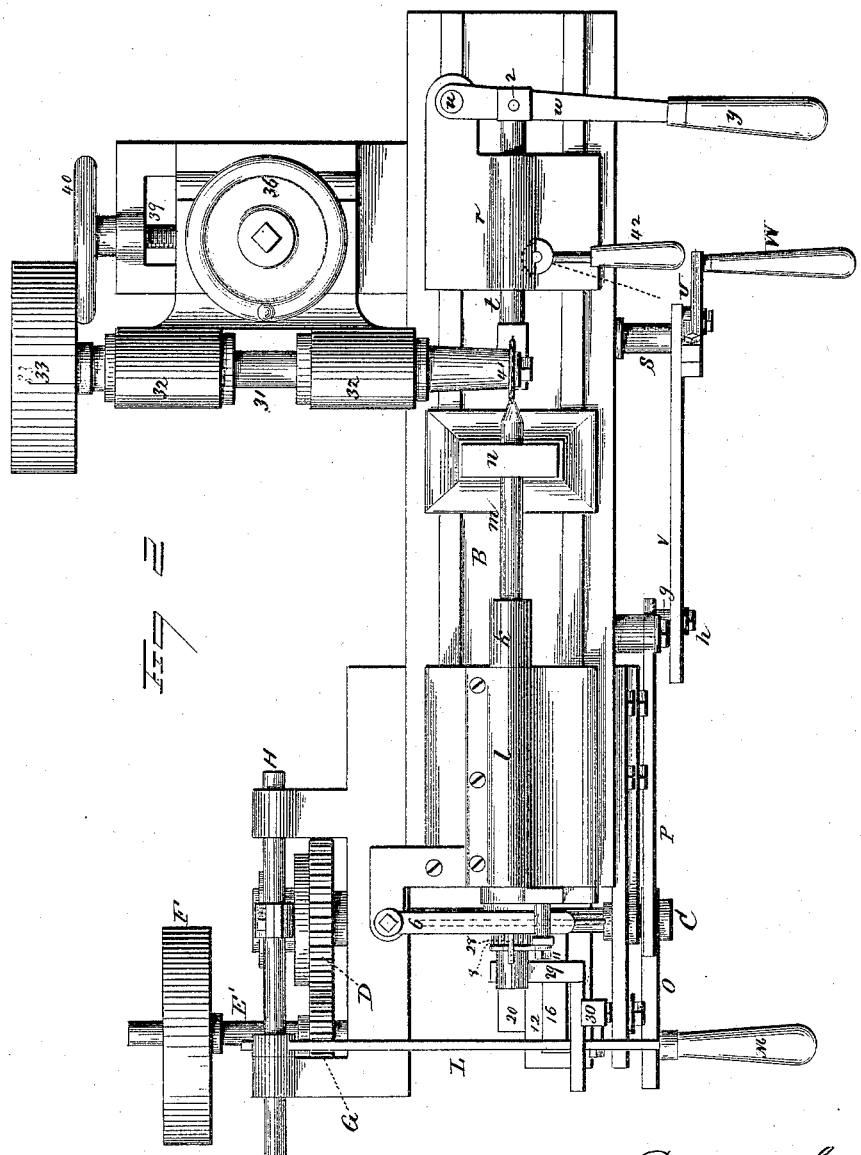

(No Model.) 6 Sheets—Sheet 3.
E. HORTON.
AUTOMATIC MILLING MACHINE.
No. 316,786. Patented Apr. 28, 1885.
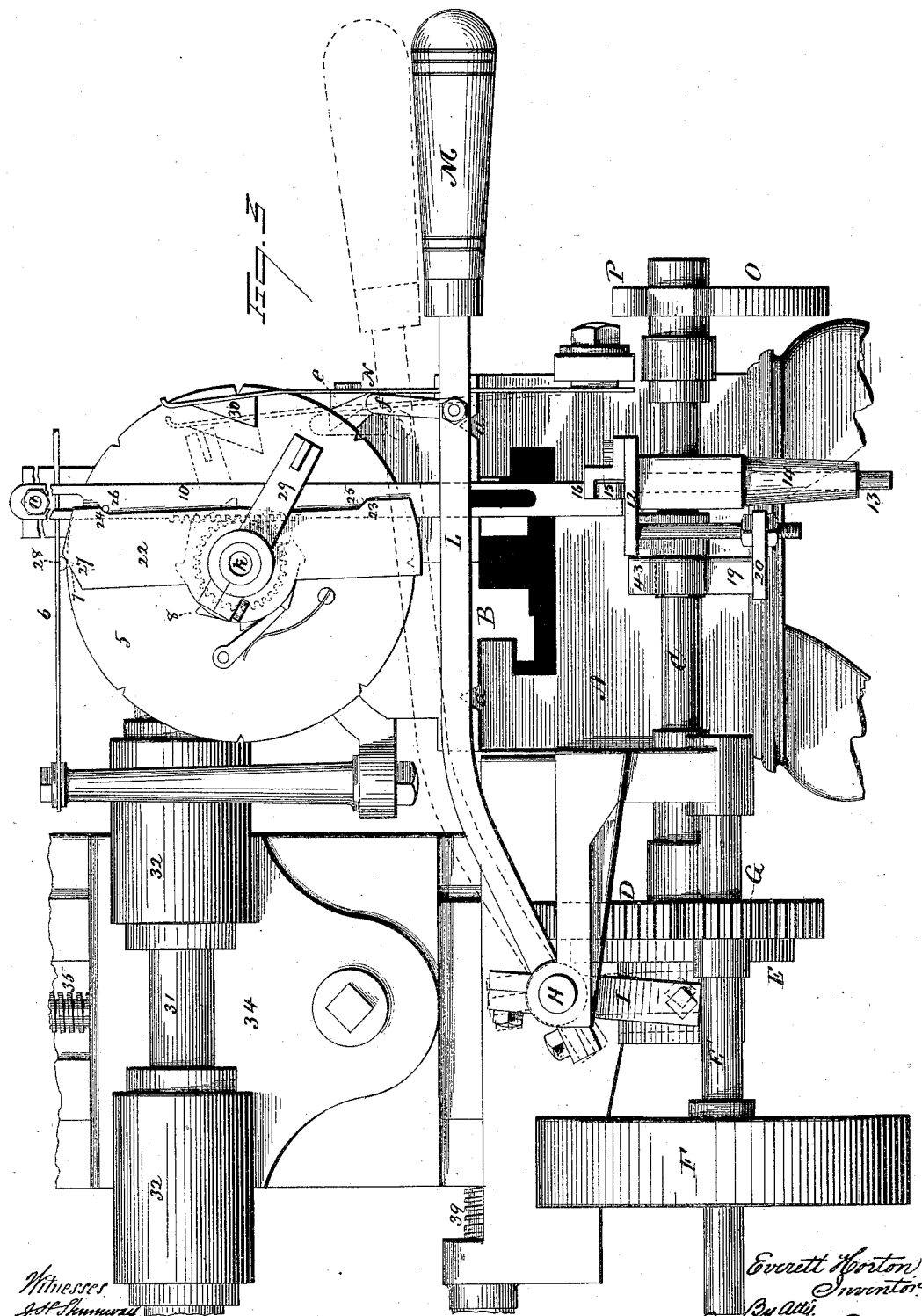

(No Model.) 6 Sheets—Sheet 4.
E. HORTON.
AUTOMATIC MILLING MACHINE.
No. 316,786. Patented Apr. 28, 1885.
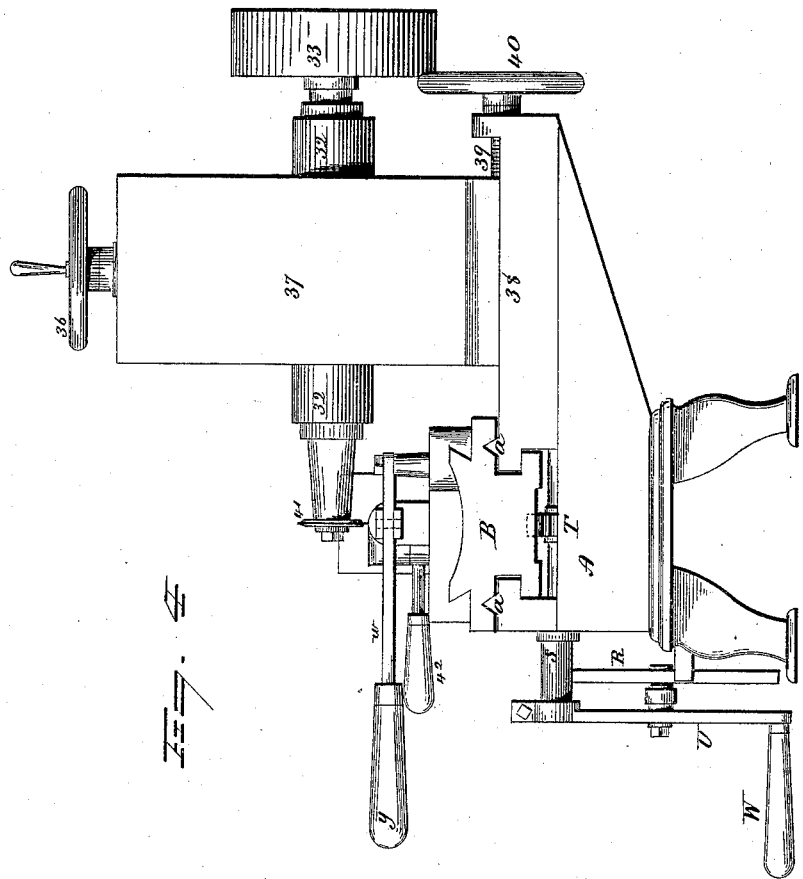

(No Model.) 6 Sheets—Sheet 5.
E. HORTON.
AUTOMATIC MILLING MACHINE.
No. 316,786. Patented Apr. 28, 1885.
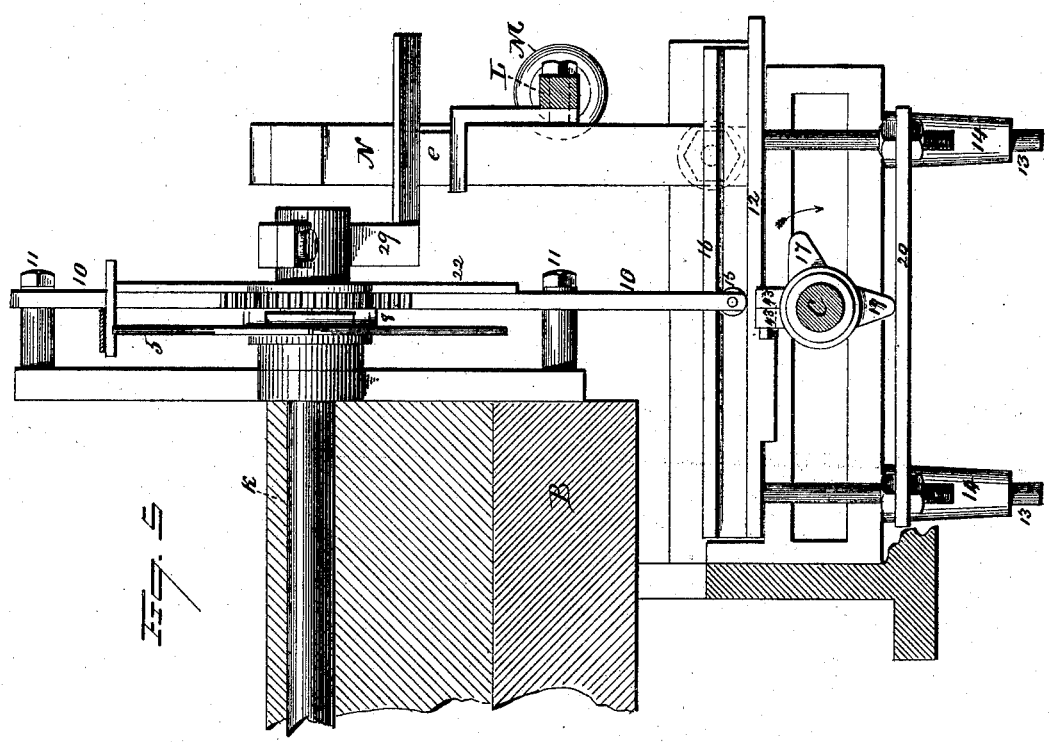
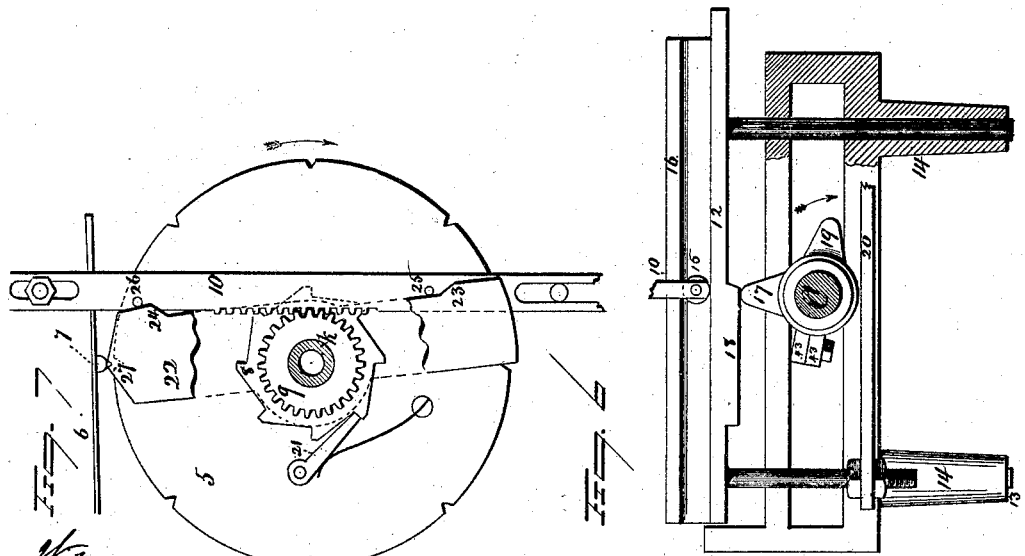
Witnesses
J. A. Shumway
Jos. L. Earle
Everett Horton, Inventor
By atty John Earle (No Model.) 6 Sheets—Sheet 6.
E. HORTON.
AUTOMATIC MILLING MACHINE.
No. 316,786. Patented Apr. 28, 1885.
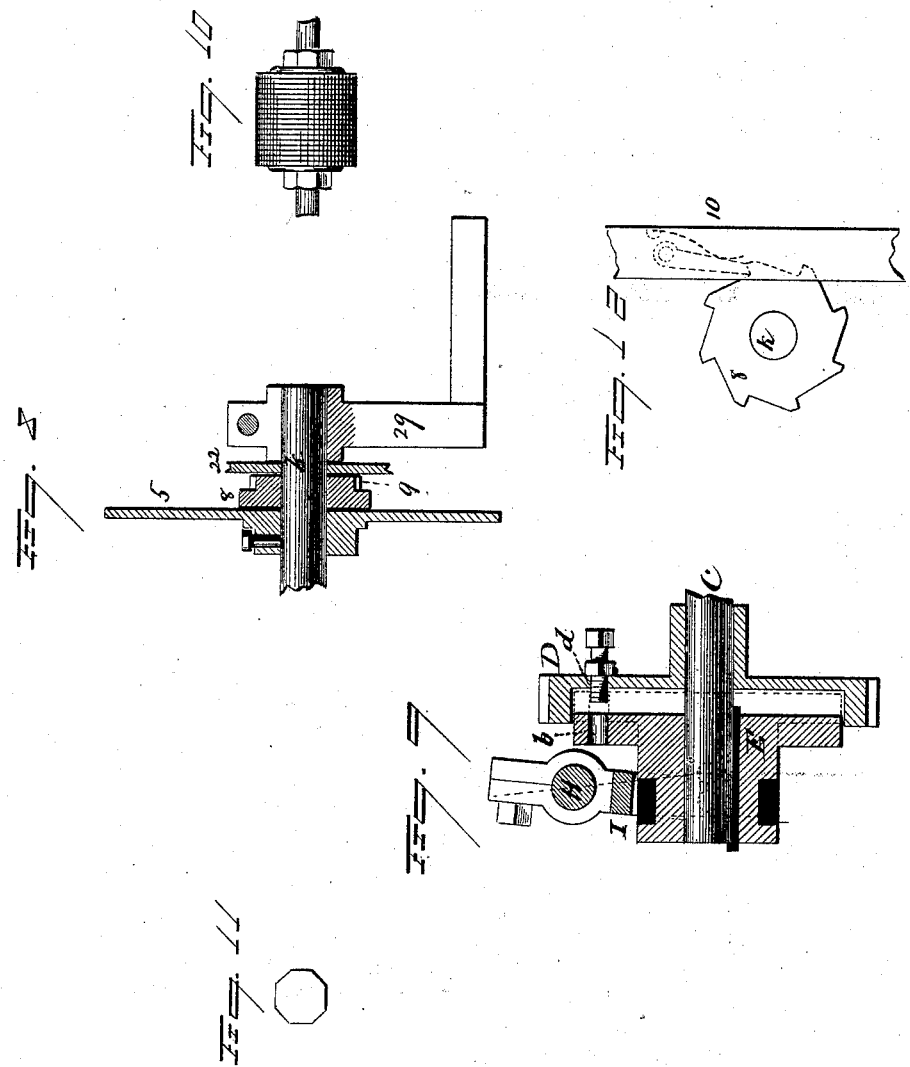

UNITED STATES PATENT OFFICE.

EVERETT HORTON, OF NEW HAVEN, CONNECTICUT.

AUTOMATIC MILLING-MACHINE.

SPECIFICATION forming part of Letters Patent No. 316,786, dated April 28, 1885.

Application filed January 26, 1885. (No model.)

*To all whom it may concern:*

Be it known that I, EVERETT HORTON, of New Haven, in the county of New Haven and State of Connecticut, have invented new Improvements in Automatic Milling-Machines; and I do hereby declare the following, when taken in connection with accompanying drawings and the letters of reference marked thereon, to be a full, clear, and exact description of the same, and which said drawings constitute part of this specification, and represent, in—

Figure 1, a front side view of the machine complete; Fig. 2, a top view of the same; Fig. 3, an end view from the left of Figs. 1 and 2, a portion of the tool-carrying apparatus broken away; Fig. 4, an opposite end view; Fig. 5, a longitudinal section through the carriage at the left-hand end, showing inside view of the feeding mechanism with the plate 12 in its down position; Fig. 6, the same inside view of the feeding-plate 12 in its up position; Fig. 7, an end view of the disk and pawl-and-ratchet mechanism, a portion of the dog cam-lever broken away for the purpose of illustrating the feed; Fig. 8, a longitudinal section through the disk, ratchet-gear, and lever 22, also showing the stop by means of which the power is disengaged; Fig. 9, a longitudinal section through the clutch and gear; Figs. 3, 5, 6, 7, 8, and 9 enlarged; Fig. 10, an arbor with several blanks for gear-wheels as arranged thereon for introduction to the machine; Fig. 11, a transverse section of a polygonal shape which may be wrought upon the machine; Fig. 12, a modification of the pawl-and-ratchet mechanism on the same scale as Fig. 3.

This invention relates to an improvement in that class of milling-machines in which the piece to be wrought is hung upon centers and so as to be turned thereon, presenting different points in its circumference to a cutter revolving in a plane parallel with the axis upon which the piece is suspended, such as fluting, polygonal shape, gear-cutting, &c., the machine being designed with special reference to cutting clock pinions and wheels. The pinions are formed as an integral part of a steel arbor and cut singly; but in cutting the wheels several are arranged upon a single arbor, and the cut made across the several wheels.

The object of the invention is the construction of a simple and automatic machine; and it consists in the construction and combination of parts, as hereinafter described, and more particularly recited in the claims.

A is the bed of the machine, constructed with longitudinal guides *a*, upon which the longitudinally movable carriage B is arranged.
C is the main shaft, arranged in bearings transversely across the bed. The shaft projects to the rear of the machine, and loose on that end of the shaft is a gear, D. (See Fig. 9.) On that end of the shaft, and splined to it, is a clutch, E. This clutch may be any of the usual constructions for such purpose, here represented as a disk, in which is a series of holes, *b*, in a circle concentric with the shaft, and in the gear D is a stud, *d*, in the path of the said holes, so that when the clutch is thrown inward, as indicated in broken lines, Fig. 9, one of the holes in the clutch will engage the stud *d*, so that rotation of the gear will be imparted through the clutch to the shaft.

E' is the driving-shaft, to which power is applied through a pulley, F, or otherwise, and on this shaft is a pinion, G, which works into the gear D on the main shaft C.

H is a rock-shaft at right angles to the main shaft, and on this shaft is fixed a fork, I, carrying studs, which work in an annular groove in the clutch. From the shaft a lever, L, extends to the front, provided with a handle, M, by which the operator may turn the fork I to throw the clutch into or out of engagement with the gear D, so that the power will be communicated to the main shaft or disengaged therefrom, as the case may be.

At the front of the machine is a spring, N, carrying a shoulder, *e*, so that when the lever L is raised, as indicated in broken lines, Fig. 3, the said shoulder will be thrown inward by the spring to engage an arm, *f*, on the lever L, and so as to hold the lever in its up position and continue the engagement of the clutch with its gear, but from which the lever may be released by pulling the spring forward, so as to permit the arm *f* to escape from the shoulder *e*.

On the shaft C, at the front of the machine, is a cam, O, which works beneath one arm, P, of a bell-crank lever hung upon a fulcrum, *g*. The other arm, R, of this lever extends downward, and in a slot therein a stud, $h$, is adjustably arranged. Transversely across the bed, and beneath the carriage, is a shaft, S, which carries a pinion, T, which works into a corresponding rack upon the under side of the carriage, as seen in Fig. 4, and so that as the shaft S is rotated in one direction or the other a corresponding longitudinal movement will be imparted to the carriage. The shaft S extends outward at the front of the machine, and upon its outer end a lever, U, is fixed, from which a connecting-rod, V, extends to the lever R, and is provided with one or more notches, $i$, either of which may be engaged with the stud on the arm R. As the cam O revolves from the position seen in Fig. 1, it raises the arm P of the bell-crank lever, and through the connections correspondingly turns the shaft S, as indicated in broken lines, Fig. 1, by which movement an advance movement will be imparted to the carriage.

To the under side of the arm P a spring or weight is applied, as indicated in Fig. 1, the tendency of which is to draw the arm P downward after it shall escape from the action of the cam, and so as to return the carriage. Therefore by the combined action of the cam O and the spring a reciprocating movement is imparted to the carriage. The extent of reciprocation may be increased or diminished by lowering or raising the stud $h$ in the arm R. The operator may at any time disengage the carriage from the power which moves it by lifting the connection V from the stud, and may, if he please, operate the carriage by means of the lever U, that lever being provided with a crank-like handle, W, for the purpose. On the carriage a mandrel, $k$, is arranged in a bearing, $l$, the said mandrel being in a line parallel with the path in which the carriage moves. As here represented, this mandrel carries a spindle, $m$, extending through an auxiliary support, $n$, on the carriage. At the opposite end of the carriage in a bearing, $r$, is a longitudinal slide, $t$, in line with the mandrel at the other end of the bed.

On a fulcrum, $u$, on the bearing $r$ a lever, $w$, is hung, and, extending forward, terminates in a handle, $y$. This lever is connected to the slide $t$, as at 2, and so that by means of said lever the operator may impart a longitudinal movement to said slide toward or from the spindle $m$.

In illustrating this invention I show it as arranged for cutting the teeth of a clock-pinion, 3 representing the pinion. One end of the arbor of the pinion is set into the end of the spindle $m$. The other end is supported in a bearing, 4, on the inner end of the slide $t$, the slide forcing the arbor into the mandrel with sufficient power to engage the arbor with the spindle, so that it (the arbor) may rotate as the spindle is rotated.

In the class of work for which this machine is designed a step-by-step rotation is necessary. To impart such rotation to the mandrel and thence to the work, a disk, 5, is made fast to the rear end of the mandrel $k$, having in its periphery a series of notches, the said notches corresponding in number to the number of cuts to be made, of which the number of cuts is a multiple, these notches being represented in Fig. 3 as eight in number. A spring-dog, 6, is provided, and so that its nose 7 may enter one of the notches in the periphery of the disk when presented thereto, as seen in Fig. 3, and so as to hold the disk into the position where it may be engaged.

Outside the disk, and loose on the shaft $k$, is a ratchet-wheel, 8, and concentric therewith, and formed as a part of the ratchet, is a gear-wheel, 9. (See Figs. 7 and 8.) A vertical rack or slide, 10, is arranged to work into the teeth of the gear 9, the said rack being supported on the carriage in bearings 11, as shown, and so as to be moved up and down—say as from the position seen in Fig. 3 to that seen in Fig. 7, and return—the lower end of the rack traveling with the carriage in its reciprocating or back-and-forth movement.

Below the lower end of the vertical rack 10 is a plate, 12, arranged on vertical guide-rods 13 in supports 14. The upper surface of this plate is parallel with the bed.

To the lower end of the rack 10 an anti-friction roll, 15, is applied, which travels along the upper surface of the plate 12 as the carriage moves back and forth.

On the plate 12 a flange, 16, is arranged parallel with the plate and extending over onto the anti-friction roll 15, as seen in Figs. 3 and 5, the flange and plate forming a longitudinal groove, in which the anti-friction roll travels. The plate 12 is movable up and down, as from the position in Fig. 5 to that seen in Fig. 7, and return. The plate 12 stands above the main shaft C, and on the shaft C is a cam, 17, which works against a cheek, 18, upon the under side of the plate 12, as seen in Fig. 7, and so that as the shaft revolves the cam 17 strikes the cheek 18 and raises the plate 12 to the position seen in Fig. 7. The cam 17 is made fast to the shaft C.

On the hub of the cam 17 a second cam, 19, is arranged to work upon a bar, 20, below, fixed to, and parallel with the plate 12, as seen in Figs. 3 and 5, and so that after the plate 12 has been raised, as seen in Fig. 6, and when the cam 17 escapes from the cheek 18, the cam 19 will at the proper time strike the bar 20 and force the plate 12 downward, as seen in Fig. 5. This up-and-down movement of the plate 12 imparts a corresponding up-and-down movement to the vertical rack 10. As it rises to the position seen in Fig. 7, it correspondingly turns the gear 9 and the ratchet 8, the disk 5 being held while such movement of the gear and ratchet occurs.

On the disk 5 a pawl, 21, is hung so as to engage the teeth of the ratchet. The upward movement of the rack is, say, equal to one tooth of the ratchet, and so that when the rack is at its highest position, as seen in Fig. 7, the pawl 21 will engage a tooth of the ratchet. Then when the cam 19 strikes the bar 20 to draw down the plate 12, the rack descends with it, and correspondingly turns the gear 9 and ratchet 8, and because of the engagement of the pawl 21 with the ratchet the disk will be correspondingly turned one step, and so continuing at each movement of the vertical rack one advance step will be imparted to the disk, and consequently to the mandrel and the arbor which it is holding.

To release the ratchet from engagement with the dog 6, and so that the disk may be rotated as just described, a lever, 22, is hung loose upon the mandrel $k$. Near its lower end, on the side next the rack 10, a cam, 23, is formed, and a like cam, 24, near its upper end. On the rack is a stud, 25, arranged to engage the cam 23 as the rack descends, and so as to throw the upper end of the lever 22 toward the rack. At the upper end of the rack is a like stud, 26, arranged to engage the cam 24 as the rack ascends. As the rack 10 ascends, the stud 26 passes over the cam 24 and turns the lever to the left. As seen in Fig. 7, the upper end of the lever 22 forms a cam, 27, which rides beneath a projection, 28, upon the under side of the dog 6, and so that as the lever 22 is turned, as before described, the cam 27 will raise the dog, as seen in Fig. 7. On the descent of the rack 10 the stud 25 will strike the cam 23, return the lever 22 to the position seen in Fig. 3, permitting the dog to escape from the cam 27, and return to its place to engage the next notch in the disk when presented. The time of the cams 17 and 19 with relation to the cam O is such that the up-and-down movement of the rack 10 occurs while the carriage is at rest, or during the dead part of the cam O; hence the carriage first moves forward and returns, then the mandrel is rotated one step, the carriage again advances and returns, then the disk is turned a second step, and so on, step by step during the full rotation of the mandrel. So soon as a full rotation is completed the work of the machine has been accomplished, and its further movement should cease. To make such ceasing automatic, I attach to the mandrel $k$ an arm or stop, 29, which runs in the path of the latch N when the latch is engaged with the lever L, and so that as the disk revolves, when the arm 29 or a projection therefrom arrives at the latch, it strikes an incline, 30, thereon, as indicated in broken lines, Fig. 3, and as the arm 29 continues its movement it throws the latch outward so as to disengage the lever L, thereby permitting said lever to drop and throw the clutch out of engagement.

In starting the work the arm 29 stands the first step below the latch, as seen in Fig. 3, and so that in its revolution, when it comes to its lowest step, it will strike the latch, as seen in broken lines, Fig. 3, and will throw the latch outward in completing the last step in the full rotation of the disk; hence at each termination of a full revolution the power will be automatically detached and the rotation of the mandrel cease.

The milling-tool, arranged to operate upon the piece held upon the bed, is fixed in the end of an arbor, 31. This arbor is at right angles to the mandrel $k$, and is arranged in bearings 32, power being applied to the arbor through a pulley, 33, or otherwise. The bearings 32 are upon a vertically-adjustable slide, 34, the carriage being adjusted by a vertical leading-screw, 35, operated by a hand-wheel, 36, above. The slide 34 is supported on a carriage, 37, arranged on a transverse way, 38, the said carriage moved transversely on its ways by a transverse leading-screw, 39, arranged to be operated by a hand-wheel, 40, or otherwise, so that by means of the double adjustment the tool may be raised from or dropped toward the work, or moved transversely in either direction, as may be required. The tool here represented is a gear-cutter, 41.

In Fig. 1 the machine is shown with the arbor and pinion introduced, ready for cutting, power being applied, and the cutter revolving. The carriage is moved longitudinally, carrying the pinion beneath the cutter, and so that the cutter will cut one space in the pinion, then the carriage returns, the mandrel will be rotated one step, the carriage again advanced, a second space cut, completing the first tooth, the carriage returned, the mandrel rotated a second step, the carriage again advanced, cutting the third space and completing the second tooth, and so on until all the teeth are completed. As here illustrated, and as indicated by the notches in the disk and the teeth in the ratchet, the number of teeth so cut will be eight, and when the full number of cuts shall have been made the machine will automatically stop, as before described. When the teeth of the pinion are complete, the slide $t$ is withdrawn, the arbor, with its cut pinion, removed, and another arbor with a blank pinion introduced, and cut as before. The slide $t$ is clamped in its holding condition by means of a cam-lever, 42, arranged to clamp the slide, as indicated in Fig. 2, and from which the slide is disengaged by turning the cam-lever, as indicated in broken lines. The rise of the rack 10 may occur at any point during the operation of the machine, as it performs no other office than simply turning the ratchet backward; but the turning of the work must occur at a predetermined time. This time, however, may vary according to the extent of time required for the action of the cam O. It is therefore necessary or desirable that the cam 19 should be made adjustable, and this is done by forming ears 43 on the back of the cam 19, as seen in Figs. 5 and 7, the hub of the cam being split and a screw introduced through the ears, as seen in Figs. 5 and 7, so that by loosening the screw the cam may be turned and reset to any desired point.

In cutting gears several blanks are arranged upon an arbor, as seen in Fig. 10, the arbor supported between the mandrel and slide, and so that the arbor and wheels will rotate with the mandrel. This increased number of teeth will require a change of the disk and ratchet to correspond to the number of teeth; or the disk may have a great number of notches, the ratchet corresponding, so that a given number, a multiple, of those notches will correspond to each tooth of the wheel to be cut.

If the work to be done be for a polygonal-sided piece, as seen in Fig. 11, it is arranged in the same longitudinal position and engaged with the mandrel, so as to revolve with it, the cutter being adapted to dress one side; that side dressed, the work is rotated to present the second side, and so on.

It will be understood that the movement of the carriage may be made positive in both directions by the construction of the cam O accordingly, instead of employing both cam and spring—an equivalent device too well known in mechanics to require illustration or description. In some cases the slide $t$ may be omitted, the work being supported in the mandrel alone.

While I prefer the ratchet 8 loose upon the mandrel and the pawl fixed to the disk, the pawl may be applied to the vertical slide 10 and the ratchet fixed to the disk, as seen in Fig. 12, so that in the ascent of the slide the pawl will escape from the tooth and engage in the descent. In this case it will be understood that the teeth on the slide, which make it a rack, and the gear will be dispensed with.

I claim—

1. The combination of the carriage B, rotating mandrel $k$, arranged longitudinally on said carriage, the transverse shaft C, carrying the cam O, and through which a longitudinal forward and back movement is imparted to said carriage, the disk 5, fixed to said mandrel, the vertically-guided slide 10, a pawl and ratchet between said slide and disk, and cams on said shaft C, through which an up-and-down movement is imparted to said slide, thereby imparting corresponding rotation to said mandrel, with a revolving tool arranged above said carriage, substantially as described.

2. The combination of the carriage B, rotating mandrel $k$, arranged longitudinally on said carriage, transverse shaft C, cam O thereon, and through which longitudinal back and forward movement is imparted to said carriage, disk 5, fixed to said mandrel, provided with a series of equidistant notches, the vertical slide 10, a pawl and ratchet between said slide and disk, cams on said transverse shaft, through which an up-and-down movement is imparted to said slide and a corresponding intermittent rotation to said mandrel, a dog arranged to engage successive notches in said disk to hold it at predetermined positions, and a tool arranged above the table to operate upon the work held by the said mandrel, substantially as described.

3. The combination of the carriage B, rotating mandrel $k$, arranged longitudinally on said carriage, transverse shaft C, carrying the cam O, and through which a longitudinal forward and back movement is imparted to said carriage, disk 5, fixed to said mandrel, vertical slide 10, cams on said shaft, whereby an up-and-down movement is imparted to said slide, ratchet 8, and gear 9, loose on the said mandrel, but concentric therewith, the said slide toothed corresponding to the said gear, pawl 21, hung upon said disk, to engage the teeth of said ratchet, and a tool arranged above the carriage to operate upon the work supported by the mandrel, substantially as described.

4. The combination of the carriage B, rotating mandrel $k$, arranged longitudinally on said carriage, transverse shaft C, carrying the cam O, and through which a longitudinal back and forward movement is imparted to said carriage, disk 5, fixed to said mandrel, said disk provided with a series of equidistant notches, vertical slide 10, cam on said shaft to impart up-and-down movement to said slide, a pawl and ratchet between said slide and disk, whereby intermediate rotation is imparted to said disk and mandrel, spring-dog 6, its nose arranged to engage successive notches on said disk, the lever 22, constructed with cams 23 and 24, the slide 10, provided with studs arranged to act upon said cams to impart vibratory movement to said lever, the lever also constructed with a cam, 27, adapted to throw said dog from and permit its engagement with said disk, and a tool arranged above the carriage, substantially as described.

5. The combination of the carriage B, rotating mandrel $k$, arranged longitudinally on said carriage, transverse shaft C, carrying the cam O, and through which a longitudinal back and forward movement is imparted to said carriage, disk 5, fixed to said mandrel, vertical slide 10, pawl and ratchet between said slide and disk, whereby intermittent rotation is imparted to said disk and mandrel, the vertically-movable longitudinal plate 12, and flange 16, forming a groove within which the lower end of the said slide 10 will run, and above the shaft, and cam 17 on said shaft C, adapted to work beneath said plate 12, and whereby up-and-down movement is imparted to said slide 10, substantially as described.

6. The combination of the carriage B, rotating mandrel $k$, arranged longitudinally on said carriage, transverse shaft C, carrying the cam O, and through which a longitudinal back and forward movement is imparted to said carriage, disk 5, fixed to said mandrel, vertical slide 10, pawl and ratchet between said slide and disk, whereby intermittent rotation is imparted to said disk and mandrel, the vertically-movable longitudinal plate 12, and flange 16, forming a groove within which the lower end of the said slide 10 will run, and above the shaft, the bar 20, below the shaft parallel with and fixed to said plate 12, and cams 17 and 19 on said shaft, adapted to impart an up-and-down movement to said plate 12 and a corresponding up-and-down movement to said slide 10, substantially as described.

7. The combination of the carriage B, rotating mandrel $k$, arranged longitudinally on said carriage, transverse shaft C, carrying cam O, and through which a longitudinal back and forward movement is imparted to said carriage, disk 5, fixed to said mandrel, a clutch upon said transverse shaft, adapted to connect and disconnect the power therewith, lever L, connected to said clutch, and through which the clutch may be thrown into or out of engagement with the power, a spring-latch, N, adapted to engage said lever when the clutch is connected with the power, and a stop, 29, on said mandrel, adapted to disengage said latch at each full rotation of said disk, with pawl and ratchet through which intermittent rotation is imparted to said disk, substantially as described.

8. The combination of the carriage B, rotating mandrel $k$, arranged longitudinally on said carriage, transverse shaft C, cam O on said shaft, bell-crank lever P R, transverse shaft S, carrying a pinion in gear-connection with said carriage, and the connecting-rod V between said shaft S and said bell-crank lever, and through which a back and forward movement is imparted to said carriage, disk 5 on said mandrel, and a pawl and ratchet through which intermittent rotation is imparted to said disk and mandrel, substantially as described.

9. The combination of the carriage B, rotating mandrel $k$, arranged longitudinally on said carriage, the slide $t$, arranged on said carriage for longitudinal movement parallel with said mandrel, and by which said mandrel and slide the work may be supported, transverse shaft C, through which a longitudinal back and forward movement is imparted to said mandrel, disk 5 on said mandrel, pawl and ratchet through which intermittent rotation is imparted to said disk and mandrel, a clutch by which the power may be engaged or disengaged, lever L, extending from said clutch, a latch, N, arranged to engage and hold said lever when the power is engaged, and a stop on the mandrel, adapted to throw said latch from engagement with the lever at each full rotation of said disk and mandrel, substantially as described.

EVERETT HORTON.

Witnesses:
W. M. WELLMAN,
G. A. JEWETT.